(12) United States Patent
Chuang

(10) Patent No.: US 7,734,432 B2
(45) Date of Patent: Jun. 8, 2010

(54) TRANSMISSION OF A POWER LOSS CONDITION OVER A NETWORK

(75) Inventor: Tsu-Yau Chuang, Fremont, CA (US)

(73) Assignee: Cisco Technology, Inc., San Jose, CA (US)

(*) Notice: Subject to any disclaimer, the term of this patent is extended or adjusted under 35 U.S.C. 154(b) by 209 days.

(21) Appl. No.: 11/923,632

(22) Filed: Oct. 24, 2007

(65) Prior Publication Data
US 2008/0046768 A1 Feb. 21, 2008

Related U.S. Application Data

(62) Division of application No. 11/182,161, filed on Jul. 15, 2005, now Pat. No. 7,302,352.

(51) Int. Cl.
*G01R 31/00* (2006.01)
(52) U.S. Cl. .............. 702/58; 702/64; 702/65; 702/188; 713/300; 398/15; 370/245; 709/224
(58) Field of Classification Search ............ 702/58, 702/64, 65, 188; 324/126; 340/870.02; 709/224; 307/46, 66; 398/15, 16, 17, 20, 21, 38, 40; 370/245, 446; 379/93.06; 455/574; 713/300, 713/320, 340
See application file for complete search history.

(56) References Cited

U.S. PATENT DOCUMENTS

| 5,523,868 | A  | * | 6/1996  | Hawley          | 398/38    |
| 5,825,516 | A  | * | 10/1998 | Walsh           | 398/40    |
| 6,288,806 | B1 | * | 9/2001  | Touma et al.    | 398/5     |
| 6,301,340 | B1 | * | 10/2001 | Sansom et al.   | 379/93.06 |
| 6,504,630 | B1 | * | 1/2003  | Czarnocha et al.| 398/15    |
| 7,098,557 | B2 | * | 8/2006  | Swanson et al.  | 307/66    |
| 7,113,699 | B1 | * | 9/2006  | Bhate et al.    | 398/15    |
| 2003/0035377 | A1 | * | 2/2003 | Ju             | 370/245   |
| 2004/0047628 | A1 | * | 3/2004 | Passier et al. | 398/15    |

OTHER PUBLICATIONS

Maxim Integrated Products; "Dual 1.4MHz Synchronous Buck Regulator Supports USB Dying Gasp Applications"; Dec. 18, 2001; 4 pgs.; http://www.maxim-ic.com/an891.

* cited by examiner

*Primary Examiner*—Carol S Tsai
(74) *Attorney, Agent, or Firm*—Stolowitz Ford Cowger LLP

(57) ABSTRACT

A system is disclosed as including a power supply, a secondary capacitive storage device connected to the power supply, and multiple network devices powered by the power supply. The system further includes a designated device for transmitting a power loss condition over a network, where upon detection of an imminent interruption of power from the power supply the secondary capacitive storage device exclusively powers the designated device during transmission of the power loss condition, and the multiple network devices are intentionally powered off.

20 Claims, 6 Drawing Sheets

TRANSMISSION OF A POWER LOSS CONDITION OVER A NETWORK

The present application is a divisional of U.S. patent application Ser. No. 11/182,161, now U.S Pat. No. 7,302,352 entitled "Method and System for Providing Dying Gasp Support for a Network Component", filed on Jul. 15, 2005, and which is herein incorporated by reference in its entirety.

TECHNICAL FIELD

Embodiments of the invention pertain to the transmission of a power loss condition over a network.

BACKGROUND ART

Computer networks provide an infrastructure that enables communication and exchange of information among computer systems that are coupled to the network. In many cases the individual networked systems may reserve resources to accommodate communications with the other networked systems to which they are coupled. In the event of a power failure such resources may be wasted as the resources may continue to be reserved for systems that have experienced a power failure and are no longer capable of communicating.

Dying gasp features allow a message that details the imminent loss of power to a networked component to be sent over a network after the detection of the imminent loss of power. In conventional systems dying gasp systems require up to 50 ms in order to complete the process of transmitting a dying gasp message upon the detection of an imminent power failure.

Customer premise equipment (CPE) network devices that support various Digital Subscriber Line technologies (xDSL) and Integrated Services Digital Network (ISDN) are generally required to support a dying gasp system. A dying gasp system typically consists of a voltage supervisor (either external or built in to the chipset) that manages the power supply voltage and notifies the xDSL or ISDN chipset in the event that it detects a power loss. The xDSL or ISDN may then relay a message to a central office (CO) that indicates an imminent power failure.

Because of the increasing power demands of high-bandwidth xDSL chipsets such as ADSL2/+ and G.SHDSL chipsets, the amount of energy storage required to sustain the 40-50 ms of uptime may be expensive. The main form of energy storage is provided by capacitors and the amount of capacitance required is determined by the power consumption of the Wide Area Network (WAN) chipset and the power supply efficiency of the device.

Low cost power supply implementations generally use linear drop-out regulators. However, many systems that employ this approach have been found to suffer from low efficiency. Other implementations such as switchers are much more efficient but are also more expensive. These conflicting design constraints make the implementing of a cost effective dying gasp system challenging. It should be appreciated that although very large capacitors may be used to meet power demands, such approaches may be space and cost prohibitive.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1:
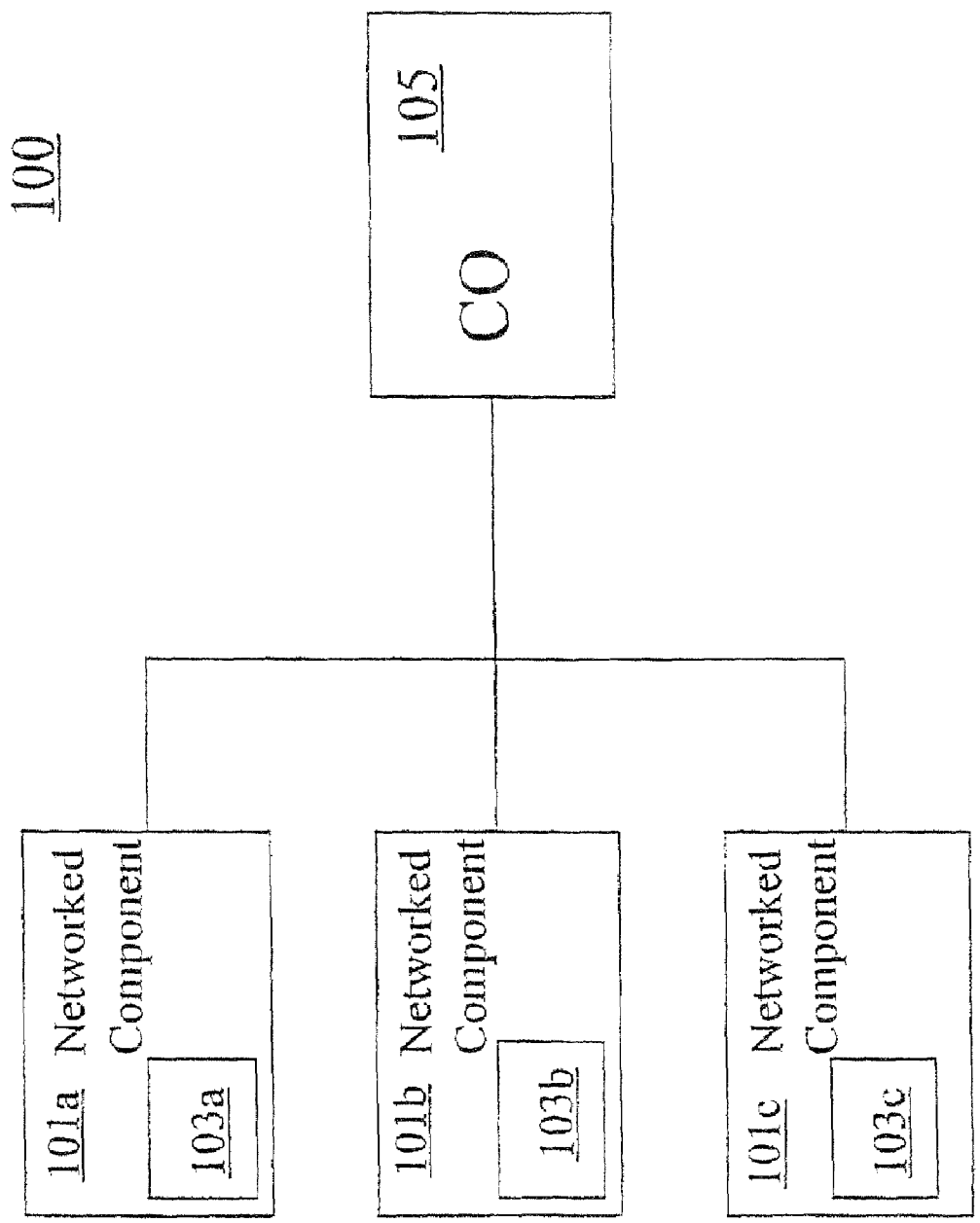
FIG. 1 shows a network including a plurality of networked components that include respective systems for providing dying gasp support according to one embodiment of the present invention.

Reference will now be made in detail to various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description of the present invention, numerous specific details are set forth in order to provide a thorough understanding of the present invention. In other instances, well-known methods, procedures, components, and circuits have not been described in detail as not to unnecessarily obscure aspects of the present invention.

Notation and Nomenclature

Some portions of the detailed descriptions that follow are presented in terms of procedures, logic blocks, processing, and other symbolic representations of operations on data bits within a computer system, server system or electronic computing device. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a computer system or similar electronic computing device. For reasons of convenience, and with reference to common usage, these signals are referred to as bits, values, elements, symbols, characters, terms, numbers, or the like with reference to the present invention.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussions, it is understood that throughout discussions of the present invention, discussions utilizing terms such as "detecting" or "disabling" or "reporting" or the like, refer to the action and processes of a computer system, or similar electronic computing device, that manipulates and transforms data. For example, the data is represented as physical (electronic) quantities within the computer system's registers and memories and is transformed into other data similarly represented as physical quantities within the computer system memories or registers or other such information storage, transmission, or display devices.

In the discussions to follow the term "networked component" is intended to refer to any computer system, e.g., customer premise equipment (CPE), computer, server, hand-held device etc., that may be coupled to a network that preferably includes a service provider. In addition, the term "dying gasp message" is intended to refer to a message that details the imminent failure of power to a networked component. The term "sub-system" is intended to refer to any sub-system of a networked component such as its CPU, memory or other storage, etc. It should be appreciated that the term central office (CO) is intended to refer to the location of a system administrator, service provider, server etc.

Providing Dying Gasp Support to a Networked Component According to One Embodiment of the Present Invention FIG. 1 shows a network 100 including a plurality of networked components 101a-101c that include respective systems for providing dying gasp support 103a-103c according to one embodiment of the present invention. In the event of a loss of power to any of the networked components 101a-101c, their respective systems for providing dying gasp support 103a-103c will act to disable components of networked component (e.g., 101a, 101b or 101c) that are not involved in sending the dying gasp message over the network.

By disabling sub-systems of the networked component (e.g.,101a, 101b or 101c) that are not involved in sending a dying gasp message over the network, stores of power existing in the networked component (e.g.,101a, 101b or 101c) at the point of imminent power failure that otherwise may be consumed by sub-systems of the networked component (e.g., 101a, 101b or 101c) that are not involved in sending the dying gasp message over the network may be used to sustain power to the sub-systems of the networked component (e.g., 101a, 101b or 101c) that actually send the dying gasp message over the network.

In the FIG. 1 embodiment, network 100 includes networked components 101a-101c (each of which includes a respective system for providing dying gasp support 103a-103c) and central office (CO) 105. Referring to FIG. 1, network 100 provides an infrastructure that enables communication and exchange of information among networked components 101a-101c and CO 105.

In one embodiment, as mentioned above, in the event that there is a loss of power to any of the networked components 101a-101c, the associated system for providing dying gasp support 103a-103c will act to disable all sub-systems of the networked component (e.g., 101a, 101b or 101c) except those sub-systems that are necessary for sending out the dying gasp message to CO 105 (or to any other desired networked component). In one embodiment, the associated system for providing dying gasp support 103a-103c will send a message to a network interface component (see discussion made with reference to FIGS. 2-4) of networked component (e.g., 101a, 101b or 101c) that indicates that a failure of power supplied to the networked component (e.g., 101a, 101b or 101c) may be imminent. In one embodiment, the network interface component will relay this message over network 100 to CO 105. In this manner existing stores of power that are available at the point of imminent power failure may be used (e.g., 101a, 101b or 101c) exclusively to support the power failure notification processes of the effected networked component (e.g., 101a, 101b or 101c).

In one embodiment, the power failure reporting functionality of the herein described system for providing dying gasp support (e.g., 103a-103c) assists in quickly identifying networked components (e.g., 101a, 101b or 101c) that may need service. This may minimize a networked components downtime related to power failure as needed attention may be more quickly directed to the particular networked component (e.g., 101a, 101b or 101c) that experiences the power failure. In addition, the prompt identification of networked components that may be experiencing power failure can hasten the release of resources reserved for those networked components.

Figure 2:
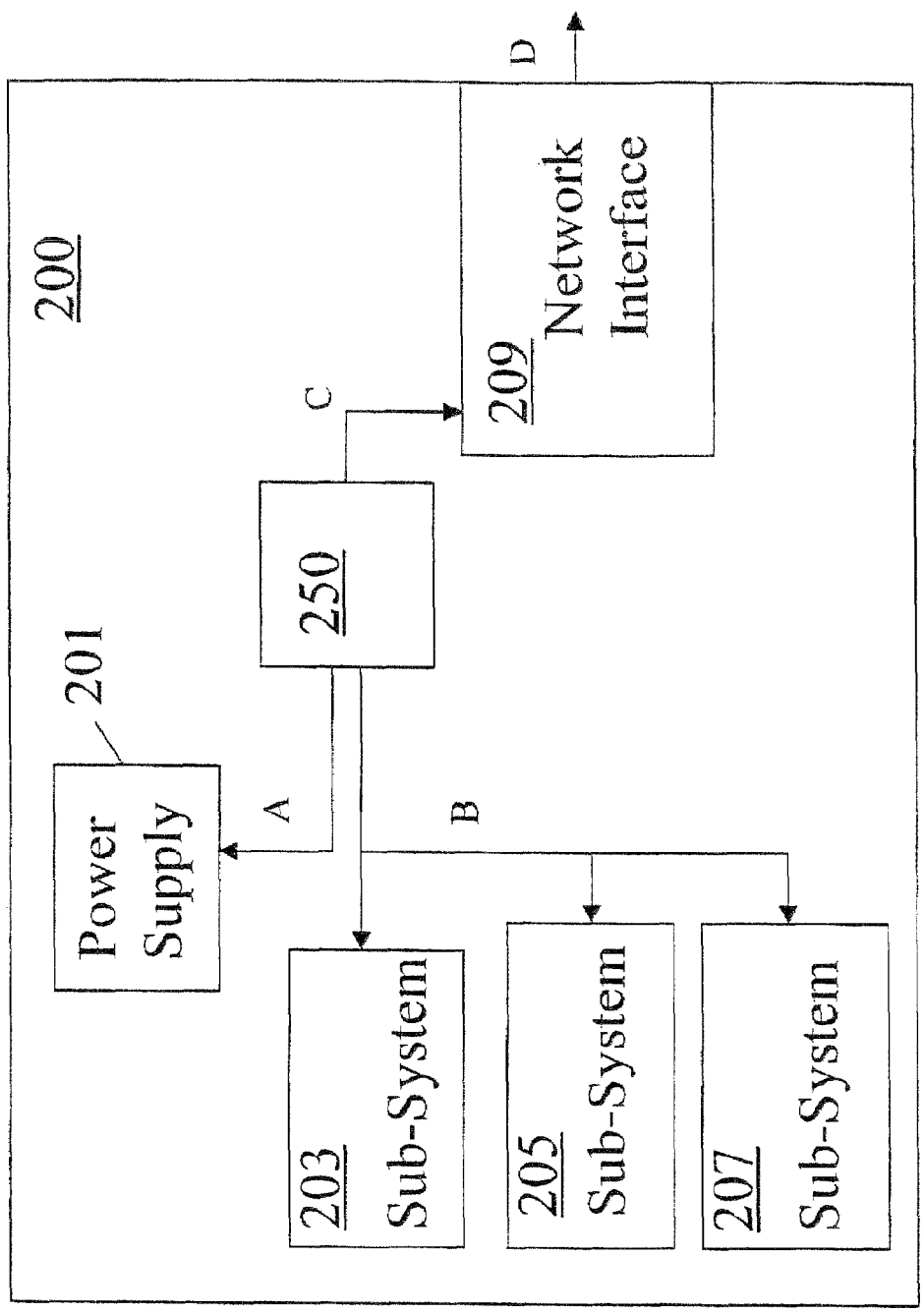
FIG. 2 shows a block diagram that illustrates the operation of a system for providing dying gasp support for networked component according to one embodiment of the present invention.

FIG. 2 shows a block diagram that illustrates the operation of a system 250 for providing dying gasp support for networked component 200 according to one embodiment of the present invention. In the FIG. 2 embodiment, networked component 200 includes power supply 201, sub-system 203, sub-system 205, sub-system 207, network interface 209 and system 250 for providing dying gasp support for networked component 200. Also depicted in FIG. 2 are communications A-D, which illustrate operations of system 250 for providing dying gasp support for networked component 200.

System 250 for providing dying gasp support for networked component 200 detects (A) imminent losses of power to networked component 200, disables (B) certain sub-systems of networked component 200 and provides reports (C) of the imminent power failure (e.g., provides notification of the imminent power failure) to network interface 209 (e.g., xDSL/ISDN etc.). In one embodiment, upon the detection (A) of an imminent loss of power to networked component 200, all sub-systems (e.g., 203-207) of networked component 200 except a designated sub-system or sub-systems may be disabled.

In one embodiment, the designated sub-system may be network interface 209. Consequently, in this embodiment, upon the detection (A) of an imminent loss in power to networked component 200, all sub-systems of networked component 200 except network interface 209 may be disabled (B). In this embodiment, sub-systems 203, 205 and 207 (e.g., CPU, memory, other storage, etc.) may be proactively disabled.

In one embodiment, the disabling (B) of the aforementioned sub-systems 203-207 allows the existing power stored in power storage systems of networked component 200 to be used to supply power to network interface 209. In one embodiment, the use of such stores of power as dedicated sources of power for network interface 209 provides sufficient energy to sustain the operation of network interface 209 for a period of time necessary for network interface 209 to receive or access notification (C) of (or receive or access an indicator of) an imminent power failure and to send a notification (D) of the imminent power failure (e.g., a dying gasp message) to the CO (or other networked component).

In one embodiment, the time required to send out a notification (D) of imminent power failure (e.g., dying gasp message) may take up to 50 ms. In other embodiments, other times may be required. In exemplary embodiments, because power to sub-systems 203-207 may be proactively disabled, the capacitance that exists in main power supply 201 at the point at which an imminent power failure is detected may be sufficient to sustain the operation of network interface 209 for the time required to send out the dying gasp message (D).

In one embodiment, power sufficient to allow the sending of three complete dying gasp messages in three successive frames may be required. In other embodiments, power sufficient to allow the sending of other numbers of successive frames of dying gasp messages may be required.

In one embodiment, capacitance additional to that normally contained in a power supply may be unnecessary since advantage is taken of the capacitance that already exists within the main power supply. Since, during the sending of a dying gasp message, only network interface 209 may be required to stay alive, (while the remainder of the sub-systems 203-207 of networked component, e.g., 200 in FIG. 2, may be powered down) the rapid discharge of the main power supply capacitors may be prevented.

In one embodiment, by proactively disabling sub-systems (e.g., 203-207) that are not involved in sending out the dying gasp message, all of the charge of the main power supply capacitors may be dedicated to sustaining the operation of network interface 209. It should be appreciated that according to one embodiment, these capacitors may have sufficient capacitance to sustain the operation of the network interface 209 for the necessary period.

Figure 3:
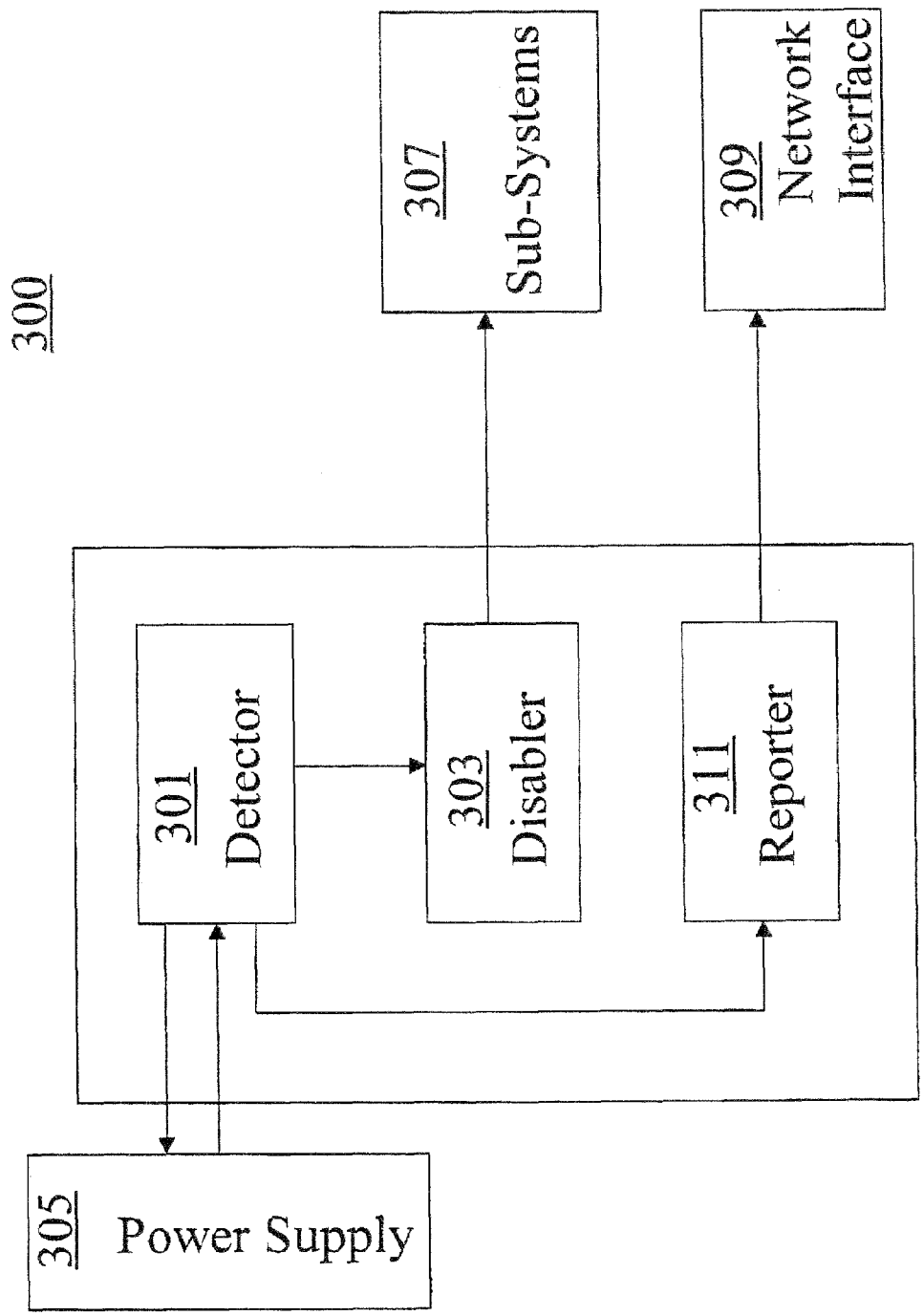
FIG. 3 shows components of a system for providing dying gasp support for a networked component according to one embodiment of the present invention.

FIG. 3 shows a system 300 for providing dying gasp support for a networked component (e.g., 200 in FIG. 2) according to one embodiment of the present invention. In the FIG. 3 embodiment, system 300 for providing dying gasp support for a networked component includes imminent power failure detector 301, sub-system disabler 303, power supply 305, sub-systems 307, network interface 309 and imminent power failure reporter 311.

Imminent power failure detector 301 detects losses of the power that is supplied to a networked component (e.g., 200 in FIG. 2). In one embodiment, imminent power failure detector 301 may include a monitor that monitors the power that is supplied to the networked component (e.g., 200 in FIG. 2). In one embodiment, if the voltage that is supplied to the networked component (e.g., 200 in FIG. 2) falls below a predetermined threshold, imminent power failure detector 301 provides or makes accessible an indicator (e.g., notification) of the imminent loss of power to sub-system disabler 303 and to imminent power failure reporter 311.

Sub-system disabler 303 disables specified sub-systems 307 of a networked component (e.g., 200 in FIG. 2) upon the detection of a loss of the power that is supplied to the networked component (e.g., 200 in FIG. 2) of a predetermined magnitude or predetermined magnitude and duration. In one embodiment, all sub-systems 307 of the networked component (e.g., 200 in FIG. 2) except a designated sub-system (or sub-systems) of the networked component (e.g., 200 in FIG. 2) may be disabled upon a detection of an imminent loss of the power that is supplied to the networked component (e.g., 200 in FIG. 2).

Imminent power failure reporter 311 reports imminent failures of the power that is supplied to a networked component (e.g., 200 in FIG. 2). In one embodiment, imminent power failure reporter 311 relays a "dying gasp" message to a network interface 309 sub-system that relays the message over the network to a CO that notifies the CO of the imminent failure of power to the networked component (e.g., 200 in FIG. 2). In one embodiment, the amount of time required to send out the dying gasp message can take up to 50 ms. In other embodiments, other lengths of time may be required to send out the dying gasp message.

In one embodiment, some or all of the components and operations of system 300 for providing dying gasp support for a networked component may be encompassed by components and operations of network interface component 309 (e.g., xDSL/ISDN etc.). In other embodiments, some or all of the components and operations of system 300 for providing dying gasp support for a networked component may be separate from components and operations of network interface component 309 but operate cooperatively with components and operations of the network interface component 309 (e.g., xDSL/ISDN etc.).

Figure 4:
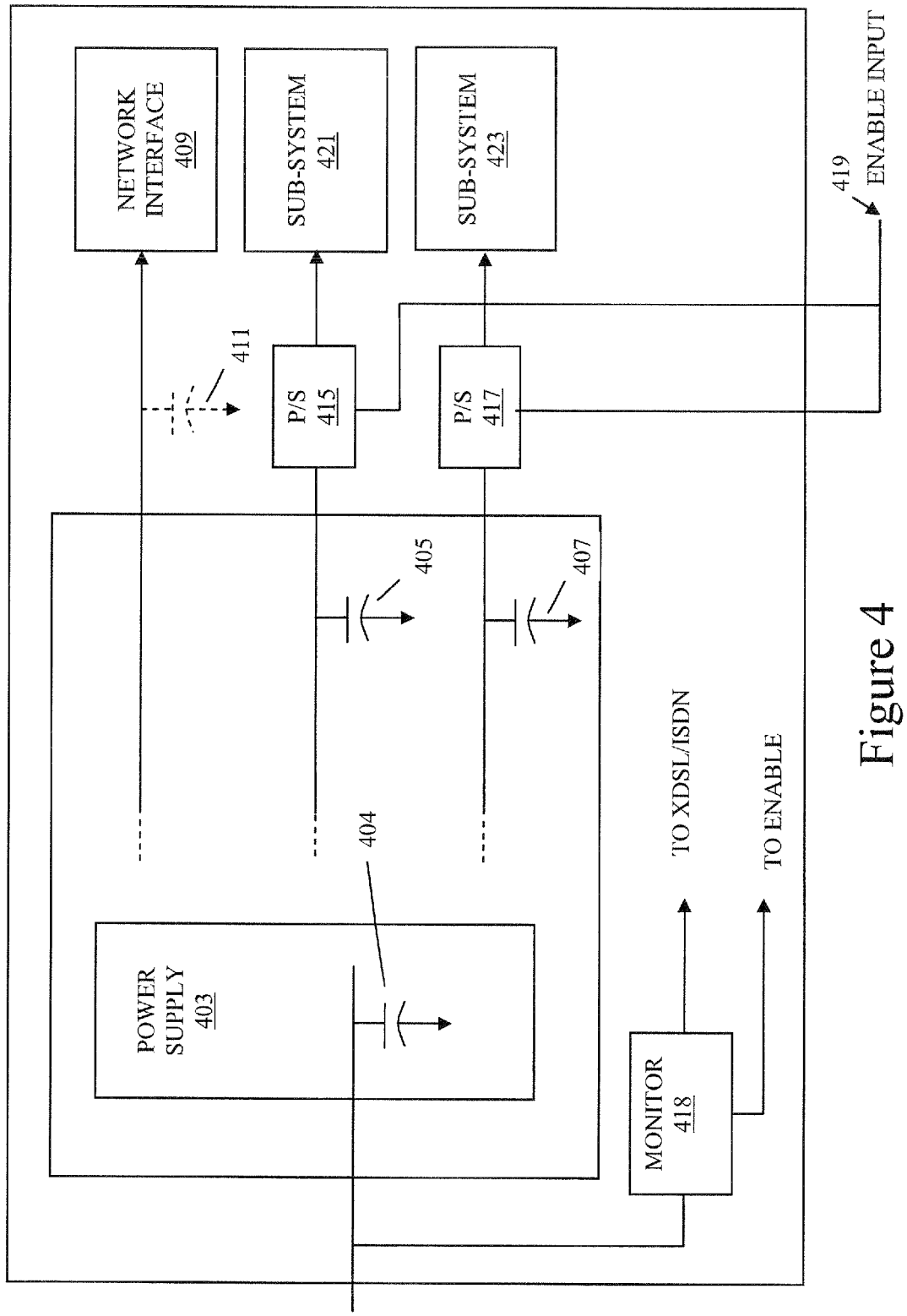
FIG. 4 shows a diagram of power supply components involved in an implementation of a system for providing dying gasp support for a networked component according to one embodiment of the present invention.

FIG. 4 shows a diagram of power supply components involved in an implementation of a system for providing dying gasp support for a networked component according to one embodiment of the present invention. FIG. 4 shows power supply 403, power supply capacitor 404, sub-system associated capacitors 405-407, network interface 409, eliminated dying gasp capacitor 411, power switch 415, power switch 417, monitor 418, enable input 419 and sub-systems 421 and 423.

Referring to FIG. 4, a networked component (e.g., 200 in FIG. 2) may include a typical power supply 403 that may include several capacitors such as power supply capacitor 404 and sub-system associated capacitors 405-407. In one embodiment, sub-system associated capacitors 405-407 may be associated with respective sub-systems of the networked component.

In one embodiment, when a loss of power to the networked component (e.g., 200 in FIG. 2) is detected, sub-systems 421 and 423 not involved in the sending of the last gasp message may be disabled and the power that is stored in components of the power supply 403 such as in power supply capacitor 404 that were formerly accessible by the disabled sub-systems 421 and 423 may be used to sustain the operation of network interface 409 (e.g., xDSL/ADSL) for the period of time that may be necessary to send out a last gasp message.

In one embodiment, an enable input 419 e.g., such as of a DC-DC regulator that may be a part of power supply 403 (not shown) may be used to shut off power to the various sub-systems of networked component other than network interface 409 (e.g., xDSL/ADSL). In one embodiment, as is shown in FIG. 4, an enable input 419 to power switches 415 and 417 may be used to disable sub-systems 421 and 423 of the networked component other than network interface 409 (e.g., xDSL/ADSL).

In other embodiments, low cost relays, software or other implementations may be used as a means of controlling the power that is supplied to the sub-systems (e.g., 421 and 423) of a networked component (e.g., 200 in FIG. 2). By proactively disabling sub-systems of the networked component (e.g., 200 in FIG. 2), the energy that is stored in the power supply capacitor may be reserved for supply to network interface 409 (e.g., xDSL/ADSL, etc.).

In operation, when AC voltage is supplied to power supply 403 it is reduced to a lower DC voltage by components of the power supply 403. This voltage charges power supply capacitor 404 while a further reduced downstream voltage charges sub-system associated capacitors 405-407. When power monitor 418 detects an imminent loss of power in the power line it generates a signal that is supplied to the enable input 419 of power switches 415 and 417. In addition, an indicator of the detected imminent failure of power is sent to the network interface 409. The supplying of a signal to the enable input 419 of power switches 415 and 417 prompts the disabling of sub-systems 421 and 423 (disconnecting them from the power supply) with which they are associated. In one embodiment, the power that is then stored by power supply capacitor 404 may be used exclusively to sustain the operation of network interface 409 for the period necessary for the network interface 409 to send out the dying gasp message.

In one embodiment, because power may be supplied by the power supply capacitor 404, the dying gasp capacitor 411 (shown dashed) that may be employed in conventional systems may not be necessary. In addition, because power supply capacitor 404 is an upstream capacitor it may be smaller (and thus more inexpensive) than a typical dying gasp capacitor. In one embodiment, this is because the higher upstream voltage allows the use of a smaller capacitance for a desired power product (e.g., QV).

Exemplary Operations in Accordance with Embodiments of the Present Invention

Figure 5:
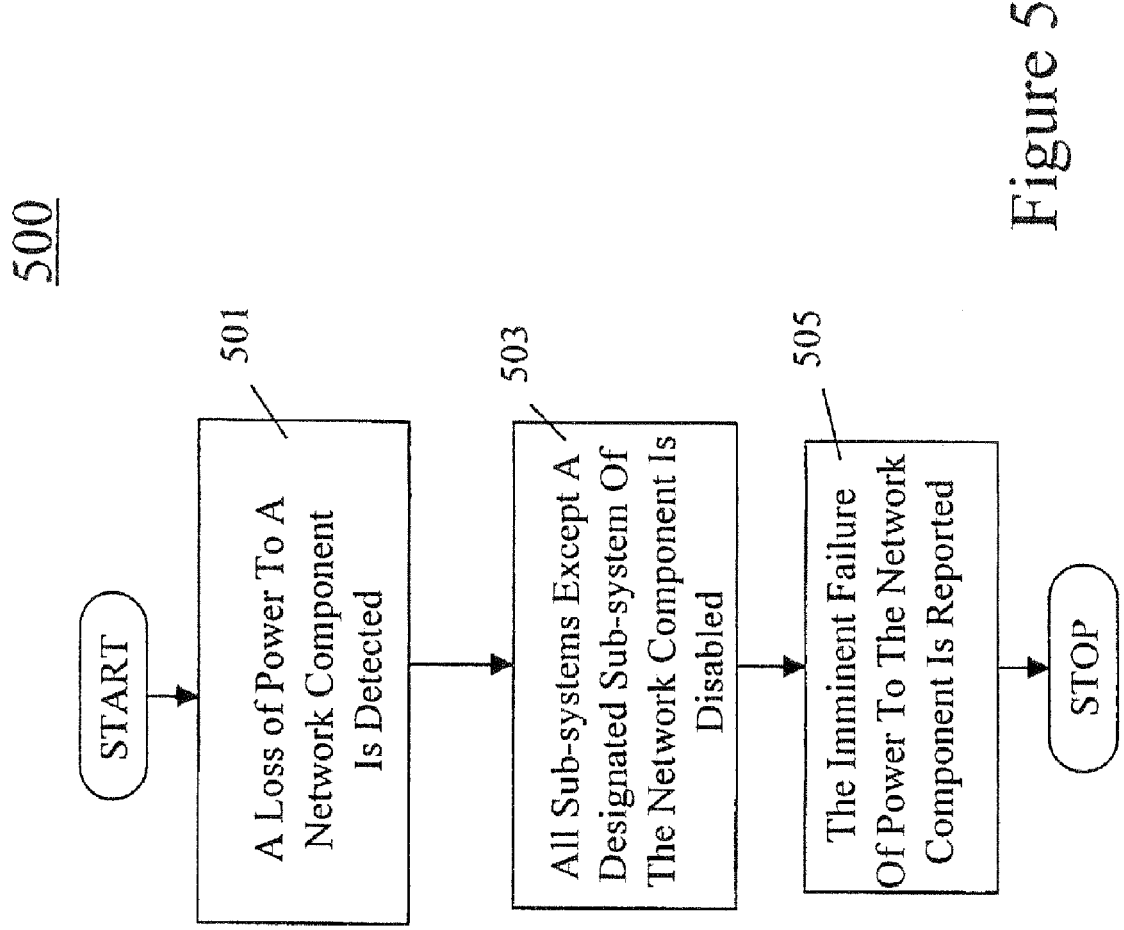
FIG. 5 is a flowchart of steps performed in a method for providing dying gasp support for a networked component according to one embodiment of the present invention.

FIG. 5 is a flowchart of steps performed in a method for providing dying gasp support for a networked component according to one embodiment of the present invention. The flowcharts illustrate processes of the present invention which, in one embodiment, are carried out by processors and electrical components under the control of computer readable and computer executable instructions. The computer readable and computer executable instructions may reside, for example, in data storage features such as computer usable volatile memory and/or computer usable non-volatile memory. However, the computer readable and computer executable instructions may reside in any type of computer readable medium. Although specific steps are disclosed in these flowcharts, such steps are exemplary. That is, the present invention is well suited to performing various other steps or variations of the steps recited in FIG. 5. Within the present embodiment, it should be appreciated that the steps of the flowchart may be performed by software, by hardware or by any combination of software and hardware.

At operation 501, the imminent loss of power to a network component is detected. In one embodiment, an imminent power failure detector (e.g., 301 in FIG. 3) may be used to detect losses of power to a networked component (e.g., 200 in FIG. 2). In one embodiment, the imminent power failure detector (e.g., 301 in FIG. 3) may include a monitor that monitors the power that is supplied to the networked component (e.g., 200 in FIG. 2). In one embodiment, if the voltage that is supplied to the networked component (e.g., 200 in FIG. 2) falls below a predetermined threshold, the imminent power failure detector (e.g., 301 in FIG. 3) may provide or makes accessible an indicator (e.g., notification) of the imminent loss of power to sub-system disabler 303 and to imminent power failure reporter 311.

At operation 503, all sub-systems of the network component are disabled except a designated sub-system of the network component upon the detection of a loss of power to the network component. In one embodiment, a sub-system disabler (e.g., 303 in FIG. 3) may disable specified sub-systems of a networked component (e.g., 200 in FIG. 2) upon the detection of a loss of power to the networked component (e.g., 200 in FIG. 2) of a predetermined magnitude or predetermined magnitude and duration.

At operation 503, the detected imminent failure of power is reported. In one embodiment, an imminent power failure reporter (e.g., 305 in FIG. 3) may report the imminent failure of power to the networked component (e.g., 200 in FIG. 2). In one embodiment, the imminent power failure reporter (e.g., 311 in FIG. 3) may send an indicator of the imminent failure of power to a network interface (e.g., 309 in FIG. 3) of the networked component which may relay a "dying gasp" message to a central office (CO) that serves to notify the CO of the imminent failure of power to the networked component (e.g., 200 in FIG. 2).

Exemplary Hardware in Accordance with Embodiments of the Present Invention

Figure 6:
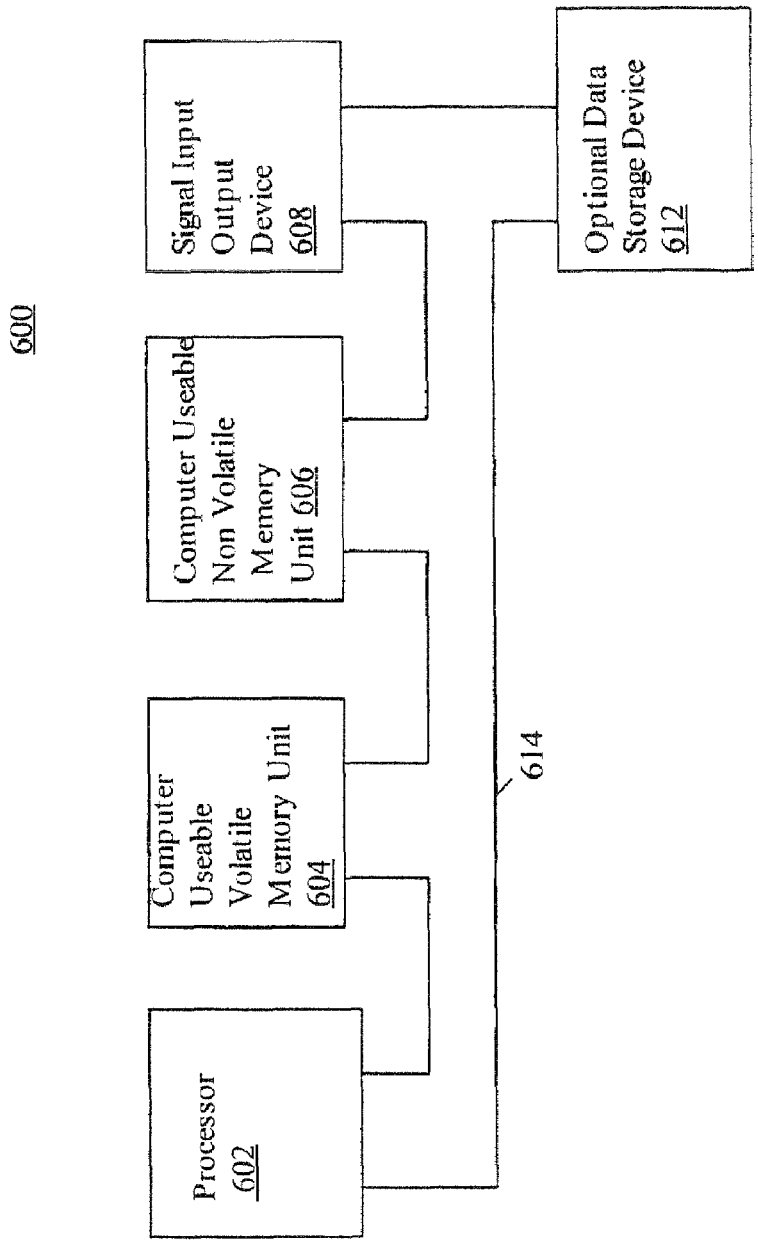
FIG. 6 is a block diagram of an exemplary computer system in accordance with embodiments of the present invention.

FIG. 6 is a block diagram of an exemplary computer system 600 in accordance with embodiments of the present invention. System 600 may be well suited to be any type of electronic computing device (e.g., server computer, embedded computing device, portable computing system etc.). Within the following discussions herein, certain processes and steps are discussed that are realized, in some embodiments, as a series of instructions (e.g., software program) that reside within computer readable memory units of computer system 600 and executed by a processor(s) of system 600. When executed, the instructions cause computer 600 to perform specific actions and exhibit specific behavior which is described in detail below. According to one embodiment, the instructions may include code that when executed perform of steps in the herein disclosed method for providing dying gasp support for a networked component.

Computer system 600 of FIG. 6 comprises an address/data bus 614 for communicating information, one or more central processors 602 coupled with bus 614 for processing information and instructions. Central processor unit 602 may be a microprocessor or any other type of processor. The computer 600 also includes data storage features such as a computer usable volatile memory unit 604 (e.g., random access memory, static RAM, dynamic RAM, etc.) coupled with bus 614 for storing information and instructions for central processor(s) 602, a computer usable non-volatile memory unit 606 (e.g., read only memory, programmable ROM, flash memory, EPROM, EEPROM, etc.) coupled with bus 614 for storing static information and instructions for processor(s) 602. System 600 also includes one or more signal generating and receiving devices 608 coupled with bus 614 for enabling system 600 to interface with other electronic devices. The communication interface(s) 608 of the present embodiment may include wired and/or wireless communication technology such as a wireless telephone circuitry. For example, in some embodiments, the communication interface 608 is a serial communication port, but could also alternatively be any of a number of well known communication standards and protocols, e.g., Universal Serial Bus (USB), Ethernet, FireWire (IEEE 1394), parallel, small computer system interface (SCSI), infrared (IR) communication, Bluetooth wireless communication, broadband, and the like.

The system 600 may also include a computer usable mass data storage device 612 such as a magnetic or optical disk and disk drive (e.g., hard drive or floppy diskette) coupled with bus 614 for storing information and instructions.

As noted above with reference to exemplary embodiments thereof a method for providing dying gasp support for a network component is disclosed. The method includes detecting an imminent loss of power to the network component and disabling all sub-systems of the network component except a designated sub-system of the network component upon the detection of the loss of power. The imminent failure of power to the network component is reported. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

The invention claimed is:

1. A system comprising:

a power supply;

a secondary capacitive storage device connected to the power supply;

multiple network devices powered by the power supply;

a monitoring device configured to detect an imminent interruption of power from the power supply;

one or more switches configured to disconnect the multiple network devices from the power supply; and a designated device for transmitting a power loss condition over a network, where upon the detection of the imminent interruption of the power from the power supply the secondary capacitive storage device powers the designated device during the transmission of the power loss condition, and where the one or more switches disconnect the multiple network devices from the power supply in response to the detection of the imminent interruption of the power from the power supply.

2. The system of claim 1 where the monitoring device generates a signal that prompts the one or more switches to disconnect the multiple network devices from the power supply when the imminent interruption of the power is detected.

3. The system of claim 1 including one or more additional capacitive storage devices associated with each of the multiple network devices, where the one or more additional capacitive storage devices provide additional power to the designated device upon the detection of the imminent interruption of the power from the power supply, and where the designated device is powered by both the secondary capacitive storage device and the one or more additional capacitive storage devices.

4. The system of claim 3 where an additional capacitive storage device is not directly associated with the designated device.

5. The system of claim 1 where the transmission of the power loss condition identifies which of the multiple network devices needs service.

6. The system of claim 1 where the secondary capacitive storage device exclusively powers the designated device during the transmission of the power loss condition.

7. A system comprising:
means for transmitting a power loss condition over a network;
means for providing power to a plurality of components of a network device;
means for disconnecting the plurality of components from the power; and
means for providing backup power to the network device independent from the means for providing power, where upon detection of an imminent interruption of power from a primary power supply, the means for backup power is designated to the means for transmitting the power loss condition over the network, and where the plurality of components are disconnected from the power in response to the detection of the imminent interruption of the power.

8. The system of claim 7 including means for detecting the imminent interruption of the power where, upon detecting the interruption of the power, a signal is generated that causes the means for disconnecting to disconnect the plurality of components from the power.

9. The system of claim 7 including one or more capacitive storage devices associated with each of the plurality of components.

10. The system of claim 9 where the one or more capacitive storage devices provide additional power to the means for transmitting upon the detection of the imminent interruption of the power from the primary power supply, and where the means for transmitting is powered by both the means for providing backup power and the one or more capacitive storage devices.

11. The system of claim 9 where the means for transmitting the power loss condition is exclusively powered by the means for providing backup power upon the detection of the imminent interruption of the power from the primary power supply.

12. The system of claim 7 where the network comprises a plurality of network devices, and where the transmission of the power loss condition identifies which of the plurality of network devices has lost the power.

13. The system of claim 7 where the means for providing backup power provides sufficient energy for a period of time to detect the imminent interruption of the power and transmit the power loss condition over the network.

14. Software encoded in one or more computer-readable media where the software is executable by a system that causes the system to:
transmit a power loss condition over a network including one or more network devices;
detect an imminent interruption of power to a network device, where the network device comprises multiple subsystems;
provide backup power to the network device; and
upon detection of the imminent interruption of the power from a primary power supply, disconnect the multiple subsystems from the power, where the backup power is exclusively designated to transmit the power loss condition over the network.

15. The software encoded in one or more computer-readable media of claim 14 that further causes the system to generate a signal in response to detecting the imminent interruption of the power, where the signal prompts one or more switches to disconnect the multiple subsystems.

16. The software encoded in one or more computer-readable media of claim 14 where a plurality of capacitive storage devices are associated with the multiple subsystems.

17. The software encoded in one or more computer-readable media of claim 16 where the network device comprises a network interface configured to transmit the power loss condition over the network, and where the plurality of capacitive storage devices provide the backup power to the network interface upon the detection of the imminent interruption of the power from the primary power supply.

18. The software encoded in one or more computer-readable media of claim 17 where the network interface is exclusively powered by the backup power provided by the plurality of capacitive storage devices.

19. The software encoded in one or more computer-readable media of claim 14 where the transmission of the power loss condition identifies which of the one or more network devices has lost the power.

20. The software encoded in one or more computer-readable media of claim 14 where the backup power provides sufficient energy for a period of time to detect the imminent interruption of power and transmit the power loss condition over the network.

* * * * *